US010030330B2

(12) United States Patent
Leibman et al.

(10) Patent No.: US 10,030,330 B2
(45) Date of Patent: Jul. 24, 2018

(54) WASHING MACHINE APPLIANCE

(71) Applicant: General Electric Company, Schenectady, NY (US)

(72) Inventors: Alexander Boris Leibman, Prospect, KY (US); Paul Owen Davis, Prospect, KY (US); Mark William Thomas Worley, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 414 days.

(21) Appl. No.: 14/696,545

(22) Filed: Apr. 27, 2015

(65) Prior Publication Data

US 2016/0312392 A1    Oct. 27, 2016

(51) Int. Cl.
| | |
|---|---|
| *D06F 33/00* | (2006.01) |
| *D06F 37/20* | (2006.01) |
| *D06F 37/12* | (2006.01) |
| *D06F 35/00* | (2006.01) |
| *D06F 39/08* | (2006.01) |
| *D06F 37/36* | (2006.01) |
| *D06F 37/24* | (2006.01) |

(52) U.S. Cl.
CPC ............ *D06F 37/203* (2013.01); *D06F 37/12* (2013.01); *D06F 35/005* (2013.01); *D06F 37/24* (2013.01); *D06F 37/36* (2013.01); *D06F 39/083* (2013.01); *D06F 39/087* (2013.01); *D06F 39/088* (2013.01)

(58) Field of Classification Search
CPC ...... D06F 37/203; D06F 33/02; D06F 35/007; D06F 39/003; D06F 35/006

USPC ........ 8/159, 158, 137, 142, 149.2; 68/12.06, 68/12.02, 12.14, 23.1, 12.12, 207, 23 R, 68/23.2, 23.5, 12.01, 200, 208, 12.19, 147
See application file for complete search history.

(56) References Cited

U.S. PATENT DOCUMENTS

| | | | |
|---|---|---|---|
| 2,421,251 A | 5/1947 | Dunham | |
| 2,539,533 A | 1/1951 | Douglas | |
| 2,964,192 A | 12/1960 | Brown | |
| 5,361,439 A * | 11/1994 | Malchow | .............. D06F 35/007 |
| | | | 68/12.12 |
| 6,129,768 A | 10/2000 | Johnson et al. | |
| 2004/0139556 A1* | 7/2004 | Lee | ........................ D06F 39/003 |
| | | | 8/158 |
| 2004/0139557 A1* | 7/2004 | Seo | ........................ D06F 35/007 |
| | | | 8/159 |
| 2005/0000033 A1* | 1/2005 | Park | ........................ D06F 37/203 |
| | | | 8/159 |

(Continued)

*Primary Examiner* — David G Cormier
*Assistant Examiner* — Thomas Bucci
(74) *Attorney, Agent, or Firm* — Dority & Manning, P.A.

(57) ABSTRACT

A method for washing articles in a wash chamber of the washing machine appliance is provided. The method includes providing a tub and a basket, the basket rotatably positioned within a tub, with an amount of wash water for washing one or more articles positioned in the basket. After the wash cycle, the method initiates a spin cycle while maintaining at least a minimum amount of wash water from the wash cycle in the basket and tub. Maintaining the wash water during the initiation of the spin cycle can assist in preventing an imbalance of the wash load. For example, the wash load may be more evenly distributed during the draining of the wash water, as the wash basket is spinning during such draining of the wash water.

18 Claims, 4 Drawing Sheets

(56) References Cited

U.S. PATENT DOCUMENTS

| | | | |
|---|---|---|---|
| 2005/0022319 A1* | 2/2005 | Kim | D06F 39/083 8/159 |
| 2005/0022564 A1* | 2/2005 | Kim | D06F 39/003 68/12.04 |
| 2005/0044640 A1* | 3/2005 | Hyeong | D06F 39/085 8/159 |
| 2005/0283919 A1* | 12/2005 | Kim | D06F 35/007 8/158 |
| 2006/0185095 A1* | 8/2006 | Mitts | D06F 35/007 8/158 |
| 2007/0107138 A1* | 5/2007 | Bernardino | D06F 35/006 8/158 |
| 2007/0124871 A1* | 6/2007 | Kwon | D06F 35/007 8/159 |
| 2007/0186356 A1* | 8/2007 | Kwon | D06F 35/007 8/158 |
| 2008/0086823 A1* | 4/2008 | Choi | D06F 35/006 8/159 |
| 2009/0077755 A1* | 3/2009 | Park | D06F 35/00 8/137 |
| 2009/0106913 A1* | 4/2009 | Suel, II | G01G 19/56 8/159 |
| 2009/0183318 A1* | 7/2009 | Kim | D06F 37/225 8/159 |
| 2010/0088829 A1* | 4/2010 | Park | D06F 37/203 8/159 |
| 2010/0281625 A1* | 11/2010 | Oh | D06F 35/006 8/137 |
| 2011/0099728 A1* | 5/2011 | Kim | D06F 35/006 8/137 |
| 2012/0272690 A1 | 11/2012 | Vincent et al. | |
| 2013/0233028 A1 | 9/2013 | Naber et al. | |
| 2015/0240406 A1* | 8/2015 | Kim | D06F 37/225 34/427 |

* cited by examiner

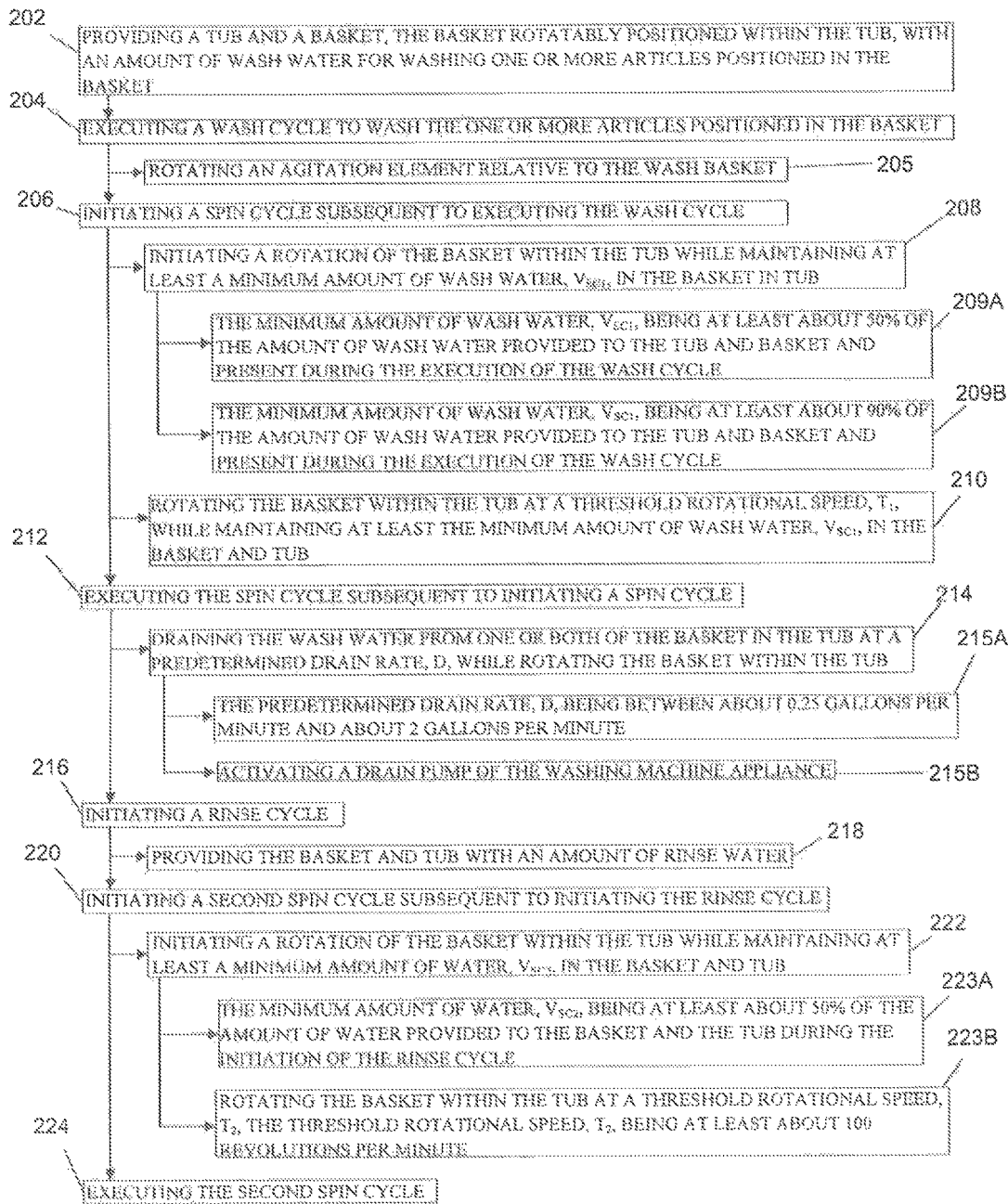
FIG. -3-

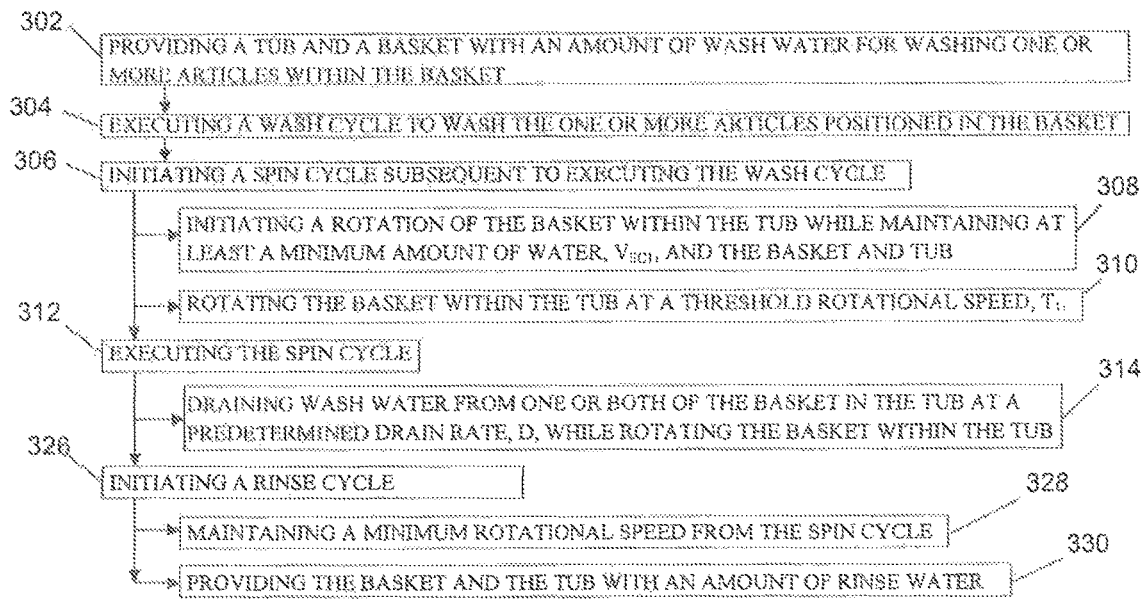
FIG. -4-

WASHING MACHINE APPLIANCE

FIELD OF THE INVENTION

The present subject matter relates generally to washing machine appliances and methods for operating the same.

BACKGROUND OF THE INVENTION

During the operation of a washing machine, particularly during spin cycles, the washing machine can sometimes experience extreme vibration. These vibrations can cause displacement of the washing machine as it "walks" across a surface, such as a floor. Typically, this event is due to the different shapes and densities of the clothing or other articles that are being washed which, after a washing cycle and draining the wash basket, can stick together and cause differences in the center of mass inside the wash basket. The vibration problem can also be caused by the introduction of relatively heavier articles into the wash basket.

By way of example, after the washing cycle and draining the wash basket, the relatively heavy articles may be located on one side of the wash basket or in a manner that causes the center of mass of the combined wash basket and articles (such as the clothes and other items being washed) to be off center. As the wash basket is rotated, particularly at high speeds, the imbalance can generate undesired strain in the washing machine components, an undesirable level of noise, and/or "walking" of the appliance. In an extreme or prolonged situation, the imbalance created by the excessive vibration can also wear-out and damage the washing machine components.

As a result, in order to counter the out of balance wash load, various devices have been proposed. For example, washing machines have been equipped with balance rings, which are typically hollow rings placed on the top of the wash basket. Inside the ring (or toroid), a weight, such as a fluid and/or movable metal objects, have been inserted. During operation, the ring will act as a counterweight to the out of balance load of clothes because the fluid and/or solid balls will move to a position within the ring that counters imbalance created by the articles in the wash basket so as to balance the overall mass of wash basket and articles within the wash basket.

However, with the above embodiments, the actual imbalance of the articles themselves is not prevented or corrected. Accordingly, a washing machine appliance capable of preventing or correcting an imbalanced load would be useful. More particularly, method of operating a washing machine to prevent or to correct an imbalanced load would be particularly beneficial.

BRIEF DESCRIPTION OF THE INVENTION

Aspects and advantages of the invention will be set forth in part in the following description, or may be apparent from the description, or may be learned through practice of the invention.

In one exemplary aspect, a method is provided for washing articles in a washing machine appliance. The method includes providing a tub and a basket, the basket rotatably positioned within a tub, with an amount of wash water for washing one or more articles positioned in the basket. The method also includes executing a wash cycle to wash the one or more articles positioned within the basket. The method also includes initiating a spin cycle subsequent to executing the wash cycle. Initiating the spin cycle includes initiating a rotation of the basket within the tub while maintaining at least a minimum amount of wash water, $V_{SC1}$, in the basket and tub. The minimum amount of wash water, $V_{SC1}$, is at least about fifty percent of the amount of wash water present during the execution of the wash cycle.

In one exemplary embodiment, a washing machine appliance is provided. The washing machine appliance includes a tub, a basket rotatably positioned within the tub, and a controller. The controller is configured to provide the tub and the basket with an amount of wash water for washing one or more articles positioned in the basket. The controller is further configured to execute a wash cycle to wash the one or more articles in the basket and initiate a spin cycle subsequent to executing the wash cycle. Initiating the spin cycle includes initiating a rotation of the basket within the tub while maintaining at least a minimum amount of wash water, $V_{SC1}$, in the basket and tub. The minimum amount of wash water, $V_{SC1}$, is at least about fifty percent of the amount of wash water present during the execution of the wash cycle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 3 provides a flow chart of a method in accordance with an exemplary aspect of the present disclosure.

FIG. 4 provides a flow chart of a method in accordance with another exemplary aspect of the present disclosure.

FIG. 4 provides a flow chart of a method in accordance with another exemplary aspect of the present disclosure.

DETAILED DESCRIPTION

Figure 1:
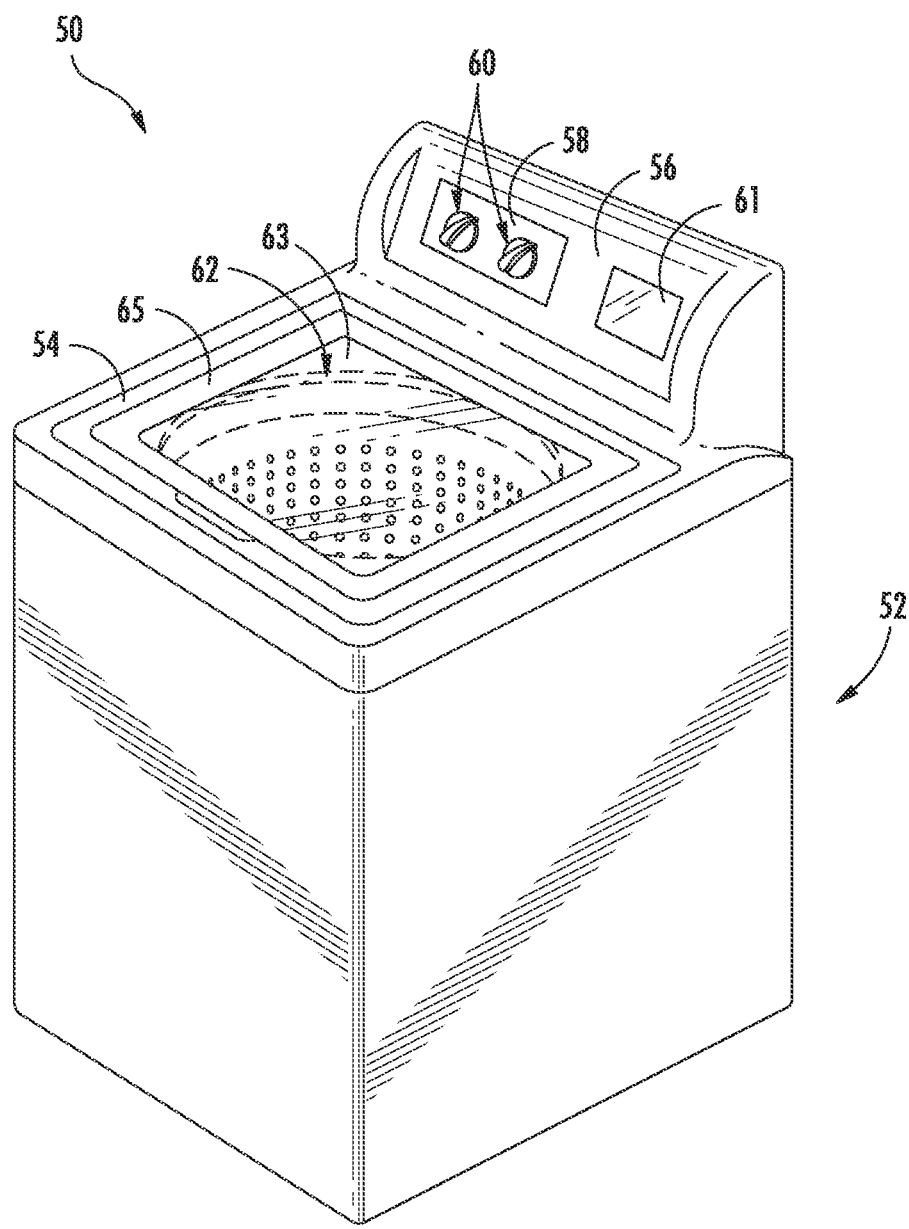
FIG. 1 provides a perspective view of a washing machine appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a washing machine appliance 50 according to an exemplary embodiment of the present subject matter. As may be seen in FIG. 1, washing machine appliance 50 includes a cabinet 52 and a cover 54.

A backsplash 56 extends from cover 54, and a control panel 58, including a plurality of input selectors 60, is coupled to backsplash 56.

Control panel 58 and input selectors 60 collectively form a user interface input for operator selection of machine cycles and features, and in one embodiment, a display 61 indicates selected features, a countdown timer, and/or other items of interest to machine users. It should be appreciated, however, that in other exemplary embodiments, the control panel 58, input selectors 60, and display 61, may have any other suitable configuration. For example, in other exemplary embodiments, one or more of the input selectors 60 may be configured as manual "push-button" input selectors, or alternatively may be configured as a touchscreen on, e.g., display 61.

A lid 62 is mounted to cover 54 and is rotatable between an open position (not shown) facilitating access to a tub, also referred to as a wash tub, 64 (FIG. 2) located within cabinet 52 and a closed position (shown in FIG. 1) forming an enclosure over tub 64. Lid 62 in exemplary embodiment includes a transparent panel 63, which may be formed of, for example, glass, plastic, or any other suitable material. The transparency of the panel 63 allows users to see through the panel 63, and into the tub 64 when the lid 62 is in the closed position. In some embodiments, the panel 63 may itself generally form the lid 62. In other embodiments, the lid 62 may include the panel 63 and a frame 65 surrounding and encasing the panel 63. Alternatively, panel 63 need not be transparent.

Figure 2:
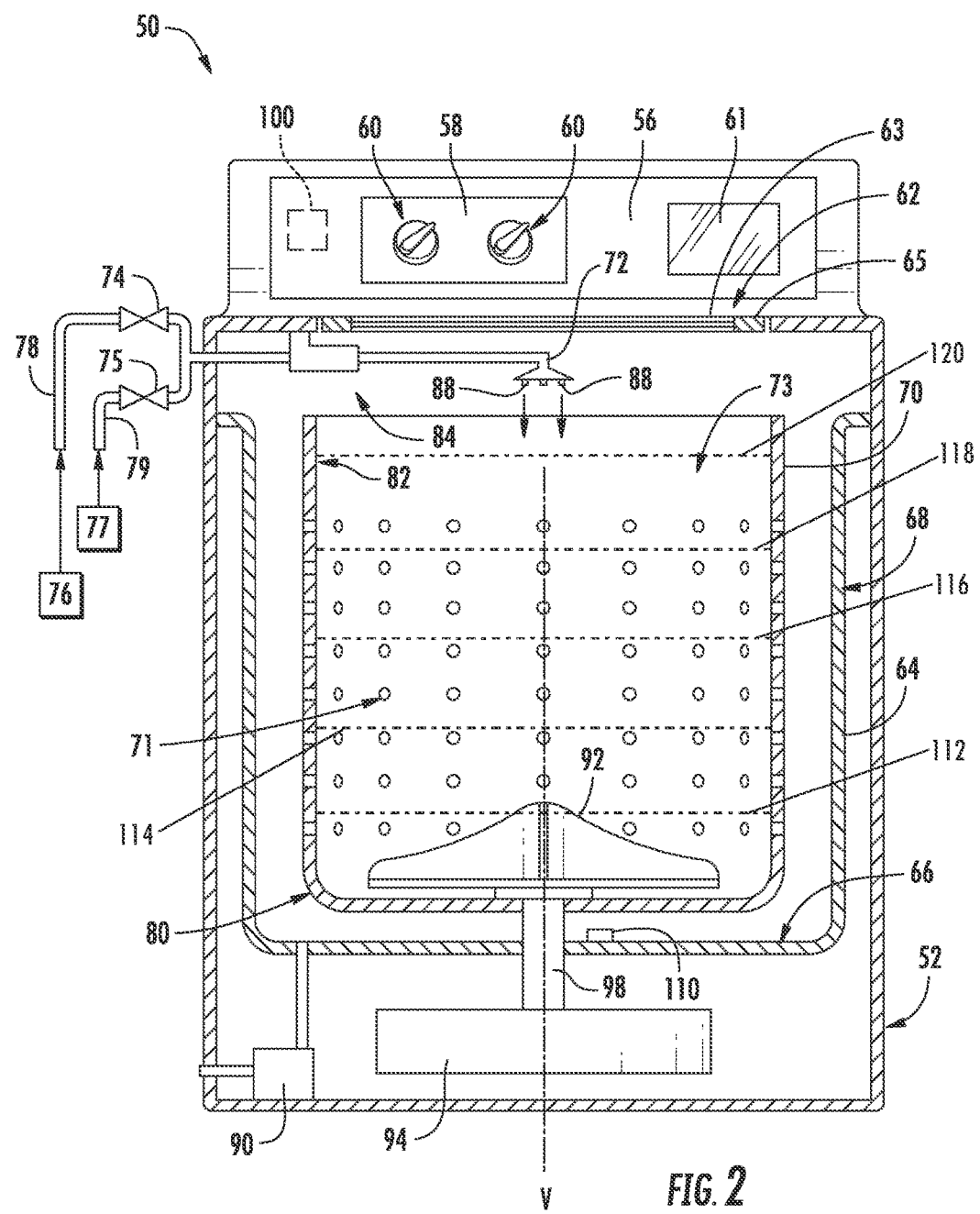
FIG. 2 provides a front, section view of the exemplary washing machine appliance of FIG. 1.

FIG. 2 provides a front, cross-section view of the exemplary washing machine appliance 50 of FIG. 1. As may be seen in FIG. 2, tub 64 includes a bottom wall 66 and a sidewall 68. A wash drum or basket 70 is rotatably mounted within tub 64. In particular, basket 70 is rotatable about a vertical axis V. Thus, washing machine appliance is generally referred to as a vertical axis washing machine appliance. Basket 70 defines a wash chamber 73 for receipt of articles for washing and extends, e.g., vertically, between a bottom portion 80 and a top portion 82. Basket 70 includes a plurality of openings or perforations 71 therein to facilitate fluid communication between an interior of basket 70 and tub 64.

A nozzle 72 is configured for flowing a liquid into tub 64. In particular, nozzle 72 may be positioned at or adjacent to top portion 82 of basket 70. Nozzle 72 may be in fluid communication with one or more water sources 76, 77 in order to direct liquid (e.g. water) into tub 64 and/or onto articles within chamber 73 of basket 70. Nozzle 72 may further include apertures 88 through which water may be sprayed into the tub 64. Apertures 88 may, for example, be tubes extending from the nozzles 72 as illustrated, or simply holes defined in the nozzles 72 or any other suitable openings through which water may be sprayed. Nozzle 72 may additionally include other openings, holes, etc. (not shown) through which water may be flowed, i.e. sprayed or poured, into the tub 64.

Various valves may regulate the flow of fluid through nozzle 72. For example, a flow regulator may be provided to control a flow of hot and/or cold water into the wash chamber of washing machine appliance 50. For the embodiment depicted, the flow regulator includes a hot water valve 74 and a cold water valve 75. The hot and cold water valves 74, 75 are utilized to flow hot water and cold water, respectively, therethrough. Each valve 74, 75 can selectively adjust to a closed position in order to terminate or obstruct the flow of fluid therethrough to nozzle 72. The hot water valve 74 may be in fluid communication with a hot water source 76, which may be external to the washing machine appliance 50. The cold water valve 75 may be in fluid communication with a cold water source 77, which may be external to the washing machine appliance 50. The cold water source 77 may, for example, be a commercial water supply, while the hot water source 76 may be, for example, a water heater. Such water sources 76, 77 may supply water to the appliance 50 through the respective valves 74, 75. A hot water conduit 78 and a cold water conduit 79 may supply hot and cold water, respectively, from the sources 76, 77 through the respective valves 74, 75 and to the nozzle 72.

Moreover, as is shown, the exemplary washing machine appliance defines a plurality of water-fill amounts. At least certain of the water fill amounts may be selected by a user using, e.g., one of input selectors 60. For example, the washing machine appliance 50 depicted defines five water fill amounts—a small water fill amount 112, a medium-low water fill amount 114, a medium-high water fill amount 116, a large water fill amount 118, and an extra-large water fill amount 120. However, in other exemplary embodiments, washing machine appliance 50 may instead define any other suitable number of water fill amounts and/or additional water fill amounts between the depicted amounts. Further, the water fill amounts may be user selectable, or alternatively may be automatically selected by the washing machine appliance 50.

An additive dispenser 84 may additionally be provided for directing a wash additive, such as detergent, bleach, liquid fabric softener, etc., into the tub 64. For example, dispenser 84 may be in fluid communication with nozzle 72 such that water flowing through nozzle 72 flows through dispenser 84, mixing with wash additive at a desired time during operation to form a liquid or wash fluid, before being flowed into tub 64. For the embodiment depicted, nozzle 72 is a separate downstream component from dispenser 84. In other exemplary embodiments, however, nozzle 72 and dispenser 84 may be integral, with a portion of dispenser 84 serving as the nozzle 72, or alternatively dispenser 84 may be in fluid communication with only one of hot water valve 74 or cold water valve 75. In still other exemplary embodiments, the washing machine appliance 50 may not include a dispenser, in which case a user may add one or more wash additives directly to wash chamber 73. A pump assembly 90 (shown schematically in FIG. 2) is located beneath tub 64 and basket 70 for gravity assisted flow to drain tub 64.

An agitation element 92, shown as an impeller in FIG. 2, may be disposed in basket 70 to impart an oscillatory motion to articles and liquid in chamber 73 of basket 70. In various exemplary embodiments, agitation element 92 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 92 is oriented to rotate about vertical axis V. Basket 70 and agitation element 92 are driven by a motor 94, such as a pancake motor. As motor output shaft 98 is rotated, basket 70 and agitation element 92 are operated for rotatable movement within tub 64, e.g., about vertical axis V. It should be appreciated, however, that in other exemplary embodiments, the exemplary washing machine appliance 50 may not include an agitation element 92, and instead washing machine appliance 50 may agitate articles positioned within wash chamber 73 by, e.g., rotating basket 70. Washing machine appliance 50 may also include a brake assembly (not shown) selectively applied or released for respectively maintaining basket 70 in a stationary position within tub 64 or for allowing basket 70 to spin within tub 64.

Various sensors may additionally be included in the washing machine appliance 50. For example, a pressure sensor 110 may be positioned in the tub 64 as illustrated or, alternatively, may be remotely mounted in another location within the appliance 50 and be operationally connected to tub 64 by a hose (not shown). Any suitable pressure sensor 110, such as an electronic sensor, a manometer, or another suitable gauge or sensor, may be utilized. The pressure sensor 110 may generally measure the pressure of water in the tub 64. This pressure can then be utilized to estimate the height or amount of water in the tub 64. Additionally, a suitable speed sensor can be connected to the motor 94, such as to the output shaft 98 thereof, to measure speed and indicate operation of the motor 94. Other suitable sensors, such as temperature sensors, water/moisture sensors, etc., may additionally be provided in the washing machine appliance 50.

Operation of washing machine appliance 50 is controlled by a processing device or controller 100, that is operatively coupled to the input selectors 60 located on washing machine backsplash 56 (shown in FIG. 1) for user manipulation to select washing machine cycles and features. Controller 100 may further be operatively coupled to various other components of appliance 50, such as the flow regulator (including valves 74, 75), motor 94, pressure sensor 110, other suitable sensors, etc. In response to user manipulation of the input selectors 60, controller 100 may operate the various components of washing machine appliance 50 to execute selected machine cycles and features. For example, the controller 100 may be configured to operate the washing machine appliance 50 in accordance with one or both of the exemplary methods (200) and (300) described below with respect to FIGS. 3 and 4.

Controller 100 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor, e.g., using a combination of discrete analog and/or digital logic circuitry (such as switches, amplifiers, integrators, comparators, flipflops, AND gates, and the like) to perform control functionality instead of relying upon software. Control panel 58 and other components of washing machine appliance 50 may be in communication with controller 100 via one or more signal lines or shared communication busses.

While described in the context of specific embodiments of washing machine appliance 50, using the teachings disclosed herein it will be understood that washing machine appliance 50 is provided by way of example only. Other washing machine appliances having different configurations (such as horizontal-axis washing machine appliances), different appearances, and/or different features may also be utilized with the present subject matter as well.

Referring now to FIG. 3, a flow chart of a method (200) for operating a washing machine appliance in accordance with an exemplary aspect of the present disclosure is provided. More particularly, FIG. 3 provides a flow chart of an exemplary method (200) of washing articles positioned in a wash basket of a washing machine appliance. In certain exemplary aspects, the exemplary method (200) may be used in conjunction with the exemplary washing machine appliance 50 described above with reference to FIGS. 1 and 2.

As is depicted, the exemplary method (200) includes at (202) providing a tub and a basket, the basket rotatably positioned within the tub, with an amount of wash water for washing one or more articles positioned in the basket. For example, providing the tub and the basket with an amount of water at (202) may include actuating one or more of a hot water valve and a cold water valve to provide such wash water via a nozzle to the tub and the basket. In certain exemplary aspects, providing the tub and basket with an amount of water at (202) may be in response to, e.g., a user selection of a certain wash cycle. Additionally, the amount of water provided to the tub and basket may be determined automatically by the washing machine appliance, or alternatively may be selected by a user.

The exemplary method (200) additionally includes at (204) executing a wash cycle to wash the one or more articles positioned in the basket. In certain exemplary aspects, executing the wash cycle at (204) includes at (205) rotating an agitation element relative to the wash basket. Such relative rotation of the wash basket and agitation element may cause the one or more articles positioned in the basket to rub against, e.g., one another and/or the agitation element to work in the wash water and any detergent added thereto and remove soils or other stains in the one or more articles positioned in the wash basket.

Moreover, the exemplary method (200) includes at (206) initiating a spin cycle subsequent to executing the wash cycle at (204). Initiating the spin cycle at (206) includes at (208) initiating a rotation of the basket within the tub while maintaining at least a minimum amount of wash water, $V_{SC1}$, in the basket in tub. In certain exemplary aspects, the minimum amount of wash water, $V_{SC1}$, may be at least about fifty percent (50%) of the amount of wash water provided to the tub and basket at (202) and present during the execution of the wash cycle, as is shown at (209A).

It should be appreciated, however, that in other exemplary aspects, the minimum amount of wash water, $V_{SC1}$, may instead be more than about fifty percent (50%) of the amount of wash water provided to the tub and basket at (202) and present during the execution of the wash cycle. For example, in certain exemplary aspects, the minimum amount of wash water, $V_{SC1}$, may instead be at least about severity percent (70%), at least about eighty percent (80%), at least about ninety percent (90%), as is shown at (209B), or about one hundred percent (100%) of the amount of wash water provided to the tub and basket at (202) and present during the execution of the wash cycle. Further, in still other exemplary aspects, the minimum amount of wash water, $V_{SC1}$, may alternatively be more than about one hundred percent (100%) of the amount of wash water provided to the tub and basket at (202) and present during the execution of the wash cycle. For example, in certain exemplary aspects, initiating the spin cycle at (206) may further include providing an additional amount of water to the tub and basket prior to, simultaneously with, or immediately after initiating the rotation of the wash basket at (208). Accordingly, in such an exemplary aspect, the minimum amount of water, $V_{SC1}$, may instead be at least about one hundred and five percent (105%), at least about one hundred and ten percent (110%), or at least about one hundred and fifteen percent (115%) of the amount of wash water provided to the tub and basket at (202) and present during the execution of the wash cycle. It should be appreciated, that as used herein, terms of approximation, such as, "about" or "substantially," refer to being within a ten percent (10%') margin of error.

Referring still to the exemplary method (200) of FIG. 3, initiating a rotation of the basket within the tub at (208) includes at (210) rotating the basket within the tub at a threshold rotational speed, $T_1$, while maintaining at least the minimum amount of wash water, $V_{SC1}$, in the basket and tub. For example, in certain exemplary aspects, the threshold rotational speed may be at least about fifty (50) revolutions per minute. Alternatively, however, the threshold rotational speed, $T_1$, and instead be at least about one hundred (100) revolutions per minute, at least about one hundred and twenty-five (125) revolutions per minute, at least about one hundred and fifty (150) revolutions per minute, or at least about one hundred and seventy (170) revolutions per minute.

The exemplary method (200) additionally includes at (212) executing the spin cycle subsequent to initiating a spin cycle at (210). For the aspect depicted in FIG. 3, executing the spin cycle at (212) includes at (214) draining the wash water from one or both of the basket in the tub at a predetermined drain rate, D, while rotating the basket within the tub. The predetermined drain rate, ID, may be between about 0.25 gallons per minute and about two (2) gallons per minute, as shown at 215A. Alternatively, however, the predetermined drain rate, D, may instead be between about 0.5 gallons per minute and about 1.5 gallons per minute. In still other exemplary aspects, however, any other suitable drain rate, D, may be used.

Draining the wash water from one or both of the wash basket and the tub at (214) may additionally include draining substantially all of the wash water from one or both of the wash basket and wash tub. In certain exemplary aspects draining the wash water from one or both of the basket and the tub at (214) may include activating a drain pump of the washing machine appliance, as shown in 215B. As wash water is being drained from the basket and tub, a rotational speed of the basket within the tub may gradually increase. More particularly, as wash water is being drained from the basket and tub, a weight of the basket decreases, allowing for a motor of the washing machine appliance to spin/rotate the basket within the tub at a higher rotational speed. For example, as wash water is being drained from the basket and the tub, the rotational speed of the basket within the tub may increase from the threshold rotational speed, $T_1$, up to at least about 200 revolutions per minute, up to at least about 400 revolutions per minute, up to at least about 600 revolutions per minute, or more.

A washing machine operated in accordance to the exemplary method (200) as discussed above (and as will be discussed below) may prevent and/or correct an imbalance of any wash load (i.e., the articles positioned in the basket) contained therein. More particularly, by initiating the spin cycle prior to draining the wash water present in the basket and tub from the wash cycle, the increased weight/mass of the wash water ensures the center of mass of the wash load and wash water is more closely aligned with a central axis of the basket and tub. Further, by draining the wash water from the basket and tub subsequent to reaching a threshold rotational speed, T, the rotation of the basket ensures the articles within the wash water settle in a more evenly distributed manner, such that an imbalance of the articles within the basket is minimized.

Referring still to the exemplary aspect of FIG. 3, the method (200) additionally includes at (216) initiating a rinse cycle. For the aspect depicted, initiating the rinse cycle at (216) occurs after the execution of the spin cycle at (212) and after the rotation of the basket has slowed to a near stop. Further, initiating the rinse cycle at (216) includes at (218) providing the basket and tub with an amount of rinse water. As with providing the tub and basket with an amount of wash water at (202), providing the basket and tub with an amount of rinse water at (218) may include actuating one or more of a hot water valve and a cold water valve to provide such rinse water to the basket and tub via a nozzle. The amount of rinse water provided at (218) may be commensurate with the amount of wash water provided at (202) and a size of the wash load. For example, in certain exemplary aspects, the amount of rinse water provided at (218) may be at least about three (3) gallons of water, at least about four (4) gallons of water, or at least about five (5) gallons of water. The fresh rinse water provided at (218) may remove any remaining wash detergent and wash water present in the wash load.

The exemplary method (200) additionally includes at (220) initiating a second spin cycle subsequent to initiating the rinse cycle at (216). The second spin cycle initiated at (220) may be substantially similar to the first spin cycle initiated at (206). For example, for the exemplary aspect depicted, initiating the second spin cycle at (220) includes at (222) initiating a rotation of the basket within the tub while maintaining at least a minimum amount of water, $V_{SC2}$ in the basket and tub. The minimum amount of water, $V_{SC2}$, may be at least about fifty percent (50%) of the amount of water provided to the basket and the tub at (218) during the initiation of the rinse cycle at (216), as is shown at (223A). However, in other exemplary aspects, the minimum amount of water, $V_{SC2}$, may instead be at least about seventy percent (70%), at least about eighty percent (80%), at least about ninety percent (90%), or at least about one hundred percent (100%) of the amount of water provided to the basket in the tub at (218) during the initiation of the rinse cycle at (216). Further, as with the minimum amount of water, $V_{SC1}$, the minimum amount of water, $V_{SC2}$, may in other exemplary embodiments be more than the amount of water provided to the basket and the tub at (218) during the initiation of the rinse cycle at (216). For example, in other exemplary aspects, the minimum amount of water, $V_{SC2}$, may instead be at least about one hundred and five percent (105%), at least about one hundred and ten percent (110%), or at least about one hundred and fifteen percent (115%) of the amount of water provided to the basket in the tub at (218) during the initiation of the rinse cycle at (216).

Notably, in certain exemplary aspects, initiating the rotation the basket at (222) may include, as shown at (223B), rotating the basket within the tub at a threshold rotational speed, $T_2$. Threshold rotational speed, $T_2$, may be the same threshold rotational speed, $T_1$, discussed above. For example, in certain exemplary aspects, the threshold rotational speed, $T_2$, may be at least about one hundred revolutions per minute.

Referring still to FIG. 3, the exemplary aspect further includes at (224) executing the second spin cycle, which may include draining wash water from one or both of the basket and tub at a predetermined drain rate while rotating the basket within the tub and/or draining substantially all of the water within the basket and tub after reaching the threshold rotational speed, $T_2$.

Referring now to FIG. 4, a flow chart of a method (300) for operating a washing machine appliance in accordance with another exemplary aspect of the present disclosure is provided. More particularly, FIG. 3 provides a flow chart of an exemplary method (300) of washing articles positioned in a wash basket of a washing machine appliance. In certain exemplary aspects, the exemplary method (300) may be used in conjunction with the exemplary washing machine appliance 50 described above with reference to FIGS. 1 and 2.

The exemplary method (300) of FIG. 4 is substantially similar to the exemplary method (200) described above with reference to FIG. 3. For example, the exemplary method (300) includes at (302) providing a tub and a basket with an amount of wash water for washing one or more articles within the basket and at (304) executing a wash cycle to wash the one or more articles positioned in the basket. Additionally, at (306) the exemplary aspect depicted in FIG. 4 includes initiating a spin cycle subsequent to executing the wash cycle at (304). Initiating the spin cycle at (306) also includes at (308) initiating a rotation of the basket within the tub while maintaining at least a minimum amount of water, $V_{SC1}$, and the basket and tub. Moreover, initiating the rotation of the basket at (308) includes at (310) rotating the basket within the tub at a threshold rotational speed, $T_1$.

The exemplary method (300), as with the exemplary method (200), also includes at (312) executing the spin cycle. Executing the spin cycle at (312) also includes at (314) draining wash water from one or both of the basket in the tub at a predetermined drain rate, D, while rotating the basket within the tub. Draining wash water at (314) from one or both of the basket in the tub may include activating a drain pump and eventually draining out substantially all of the wash water from the basket and tub.

However, for the exemplary aspect of FIG. 4, the method (300) includes at (326) initiating a rinse cycle. Initiating the rinse cycle at (326) includes at (328) maintaining a minimum rotational speed from the spin cycle and at (330) providing the basket and the tub with an amount of rinse water. Notably, maintaining a minimum rotational speed from the spin cycle at (328) may include maintaining a threshold rotational speed, $T_2$, which may be the same as threshold rotational speed, $T_1$, discussed above. Accordingly, in certain exemplary aspects, maintaining a minimum rotational speed from the spin cycle at (328) may include maintaining a rotational speed of at least about fifty revolutions per minute, of at least about seventy-five revolutions per minute, or of at least about one hundred revolutions per minute.

Additionally, providing the basket and the tub with an amount of rinse water at (330) may include providing the amount of rinse water directly to, e.g., an agitation element such that the agitation element disperses the amount of rinse water evenly to the wash load to remove any remaining wash water and wash detergent therein. For the exemplary aspect of FIG. 4, the amount of water provided to the basket and the tub at (330) may be less than the amount of rinse water provided at (218) discussed with the exemplary aspect of FIG. 3.

Therefore, for the exemplary aspect of FIG. 4, the wash basket does not stop rotating from when the spin cycle is initiated at (306), through the execution of the spin cycle at (312), and into the initiation of the rinse cycle at (326). Such an exemplary aspect may conserve energy and time as the method does not require reinitiating a spinning of the basket within the tub. Additionally, by initiating or maintaining a rotation of the basket within the tub during the spin cycle(s), such an exemplary embodiment may also prevent an imbalance of the wash load during operation of the washing machine appliance for the same reasons described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of washing articles in a washing machine appliance, the method comprising:
   providing a tub and a basket, the basket rotatably positioned within a tub, with an amount of wash water for washing one or more articles positioned in the basket;
   executing a wash cycle to wash the one or more articles positioned within the basket, wherein executing the wash cycle includes agitating the wash water, the one or more articles positioned in the basket, or both to work in the wash water and any detergent added thereto;
   optionally draining a portion of the amount of wash water provided for washing the one or more articles positioned in the basket;
   initiating a spin cycle subsequent to executing the wash cycle and optionally draining the portion of the amount of wash water provided for washing the one or more articles positioned in the basket, wherein initiating the spin cycle includes initiating a rotation of the basket within the tub while maintaining at least a minimum amount of wash water, $V_{SC1}$, in the basket and tub, the minimum amount of wash water, $V_{SC1}$, being at least about fifty percent of the amount of wash water provided for washing the one or more articles positioned in the basket;
   executing the spin cycle; and
   initiating a rinse cycle, wherein initiating the rinse cycle includes maintaining a rotational speed of at least one hundred rotations per minute from the spin cycle and providing the basket and the tub with an amount of rinse water.

2. The method of claim 1, wherein the minimum amount of wash water, $V_{SC1}$, is at least about ninety percent of the amount of wash water provided for washing the one or more articles positioned in the basket.

3. The method of claim 1, wherein initiating the rotation of the basket includes rotating the basket within the tub at a rotational speed of at least about one hundred revolutions per minute while maintaining at least a minimum amount of wash water, $V_{SC1}$, in the basket and tub.

4. The method of claim 1, further
   wherein executing the spin cycle includes draining wash water from one or both of the basket and the tub at a predetermined drain rate while rotating the basket within the tub.

5. The method of claim 4, wherein the predetermined drain rate is between about 0.25 gallons per minute and about two (2) gallons per minute.

6. The method of claim 4, wherein draining wash water from one or both of the basket and the tub at the predetermined drain rate includes activating a drain pump of the washing machine appliance.

7. The method of claim 1, further comprising
   optionally draining a portion of the amount of wash water provided to the basket and the tub during the initiation of the rinse cycle; and initiating a second spin cycle subsequent to initiating the rinse cycle and optionally draining the portion of the amount of wash water provided to the basket and the tub during the initiation of the rinse cycle, wherein initiating the second spin cycle includes initiating a rotation of the basket within the tub while maintaining at least a minimum amount of wash water, $V_{SC2}$, in the basket and tub, the minimum amount of wash water, $V_{SC2}$, being at least about fifty percent of the amount of water provided to the basket and tub during the initiation of the rinse cycle.

8. The method of claim 7, wherein initiating the rotation of the basket during the step of initiating the second spin cycle includes rotating the basket within the tub at a rotational speed of at least about one hundred revolutions per minute while maintaining at least a minimum amount of wash water, $V_{SC2}$, in the basket and tub.

9. The method of claim 1, wherein providing the tub and the basket with the amount of wash water comprises providing the tub and the basket with a total amount of wash water, and wherein the minimum amount of wash water, $V_{SC1}$, is at least about fifty percent of the total amount of wash water provided for washing the one or more articles positioned in the basket.

10. A washing machine appliance comprising
a tub;
a basket rotatably positioned within the tub; and
a controller configured to
provide the tub and the basket with a total amount of wash water for washing one or more articles positioned in the basket;
execute a wash cycle to wash the one or more articles in the basket, wherein in executing the wash cycle the controller is configured to agitating the wash water, the one or more articles positioned in the basket, or both to work in the wash water and any detergent added thereto;
optionally drain a portion of the amount of wash water provided for washing the one or more articles positioned in the basket;
initiate a spin cycle subsequent to executing the wash cycle and optionally draining the portion of the amount of wash water provided for washing the one or more articles positioned in the basket, wherein initiating the spin cycle includes initiating a rotation of the basket within the tub while maintaining at least a minimum amount of wash water, $V_{SC1}$, in the basket and tub, the minimum amount of wash water, $V_{SC1}$, being at least about fifty percent of the amount of wash water provided for washing the one or more articles positioned in the basket;
execute the spin cycle; and
initiate a rinse cycle, wherein initiating the rinse cycle includes maintaining a rotational speed of at least one hundred rotations per minute from the spin cycle and providing the basket and the tub with an amount of rinse water.

11. The washing machine appliance of claim 10, wherein the minimum amount of wash water, $V_{SC1}$, is at least about ninety percent of the amount of wash water provided for washing the one or more articles positioned in the basket.

12. The washing machine appliance of claim 10, wherein in initiating the rotation of the basket, the controller is configured to rotate the basket within the tub at a rotational speed of at least about one hundred revolutions per minute while maintaining at least a minimum amount of wash water, $V_{SC1}$, in the basket and tub.

13. The washing machine appliance of claim 10, wherein in executing the spin cycle, the controller is configured to drain the wash water from one or both of the basket and the tub at a predetermined drain rate subsequent to initiating a rotation of the basket within the tub.

14. The washing machine appliance of claim 13, wherein the predetermined drain rate is between about 0.25 gallons per minute and about two (2) gallons per minute.

15. The washing machine appliance of claim 13, wherein in draining wash water from one or both of the basket and the tub at the predetermined drain rate the controller is configured to activate a drain pump of the washing machine appliance.

16. The washing machine appliance of claim 10, wherein the controller is further configured to
optionally draining a portion of the amount of wash water provided to the basket and the tub during the initiation of the rinse cycle; and
initiate a second spin cycle subsequent to initiating the rinse cycle and optionally draining the portion of the amount of wash water provided to the basket and the tub during the initiation of the rinse cycle, wherein initiating the second spin cycle includes initiating a rotation of the basket within the tub while maintaining at least a minimum amount of wash water, $V_{SC2}$, in the basket and tub, the minimum amount of wash water, $V_{SC2}$, being at least about fifty percent of the amount of water provided to the basket and tub during the initiation of the rinse cycle.

17. The washing machine appliance of claim 16, wherein in initiating the rotation of the basket during the step of initiating the second spin cycle the controller is configured to rotate the basket within the tub at a rotational speed of at least about one hundred revolutions per minute while maintaining at least a minimum amount of wash water, $V_{SC2}$, in the basket and tub.

18. A method of washing articles in a washing machine appliance, the method comprising:
providing a tub and a basket, the basket rotatably positioned within a tub, with an amount of wash water for washing one or more articles positioned in the basket;
executing a wash cycle to wash the one or more articles positioned within the basket, wherein executing the wash cycle comprises agitating the wash water, the one or more articles positioned in the basket, or both to work in the wash water and any detergent added thereto;
initiating a spin cycle subsequent to executing the wash cycle, wherein initiating the spin cycle includes initiating a rotation of the basket within the tub while maintaining the wash water in the tub and basket provided for washing the one or more articles positioned in the basket;
executing the spin cycle; and
initiating a rinse cycle, wherein initiating the rinse cycle includes maintaining a rotational speed of at least one hundred rotations per minute from the spin cycle and providing the basket and the tub with an amount of rinse water.

* * * * *